United States Patent [19]

Yoshida

[11] Patent Number: 4,714,573

[45] Date of Patent: * Dec. 22, 1987

[54] METHOD OF MANUFACTURING MOLDED SLIDE FASTENER COUPLING ELEMENTS

[75] Inventor: Hiroshi Yoshida, Kurobe, Japan

[73] Assignee: Yoshida Kogyo K. K., Tokyo, Japan

[*] Notice: The portion of the term of this patent subsequent to Apr. 8, 2003 has been disclaimed.

[21] Appl. No.: 901,362

[22] Filed: Aug. 28, 1986

Related U.S. Application Data

[62] Division of Ser. No. 671,313, Nov. 14, 1984, Pat. No. 4,659,301.

[30] Foreign Application Priority Data

Nov. 15, 1983 [JP] Japan ................ 58-214828
Dec. 29, 1983 [JP] Japan ................ 58-245936

[51] Int. Cl.$^4$ .................... B29B 17/02; B29D 5/00
[52] U.S. Cl. ........................ 264/37; 264/40.7; 264/145; 264/161; 264/245; 264/252; 264/DIG. 69; 425/814
[58] Field of Search .............. 264/37, 40.1, 40.7, 264/140, 145, 161, 245, 246, 247, 252, 328.14, 328.15, DIG. 69; 425/814, DIG. 34

[56] References Cited

U.S. PATENT DOCUMENTS

| | | | |
|---|---|---|---|
| 3,097,395 | 7/1963 | Yoshida | 425/122 X |
| 4,063,860 | 12/1977 | Cushing | 264/37 |
| 4,321,027 | 3/1982 | Stoehr et al. | 264/37 X |
| 4,362,487 | 12/1982 | Takahashi | 425/122 X |
| 4,492,547 | 1/1985 | Nogai | 425/814 |
| 4,505,659 | 3/1985 | Chijiishi et al. | 425/814 |
| 4,580,963 | 4/1986 | Yoshida et al. | 425/814 |

FOREIGN PATENT DOCUMENTS 46903 3/1982 European Pat. Off. ........... 264/252

OTHER PUBLICATIONS

Boyden, J. "Automatic Scrap Recycling." In: Machinery and Equipment (1965 ed.), pp. 904–913.

Primary Examiner—Jeffery Thurlow
Assistant Examiner—Leo B. Tentoni
Attorney, Agent, or Firm—Hill, Van Santen, Steadman & Simpson

[57] ABSTRACT

A method of supplying a thermoplastic material to a molding machine for molding the same into a desired formation on slide fastener tapes is disclosed, whereby a composite plastic material, consisting in such a predetermined ratio of a fresh supply of material and removed runners and sprues, is fed so as to enable homogeneous color distribution of the resulting element chain on the fastener.

2 Claims, 4 Drawing Figures

METHOD OF MANUFACTURING MOLDED SLIDE FASTENER COUPLING ELEMENTS

This is a division, of application Ser. No. 671,313, filed 11/14/84 U.S. Pat. No. 4,659,301.

BACKGROUND OF THE INVENTION

1. Field of the Invention

This invention relates generally to the production of slide fasteners having coupling or mating elements made of a thermoplastic material, and more particularly to a method for supplying such a plastic material to a molding machine for molding the same into a desired formation on a pair of stringer tapes.

2. Prior Art

Slide fastener coupling elements of a discrete formation are provided on a pair of stringer tapes most commonly by means of injection-molding, in which instance runners, sprues and other debris of the element-forming plastic material are encountered that are to be removed from the slide fastener chain.

It has long since been desired to make use of such runners and sprues for replenishment of a supply of starting plastic materials which are versatile in color.

However, difficulty has been experienced in obtaining homogeneous color distribution of the fastener elements on the stringer tapes due to thermal decomposition, pollution or moisture absorption of the used runners and sprues.

SUMMARY OF THE INVENTION

It is an object of the present invention in the manufacture of slide fasteners to provide a method for supplying a molding machine with a composite particulate plastic material mixed up with, and consisting in such a predetermined ratio of, color master chips, colorless slave chips and runners and sprues which will enable homogeneous color distribution of the resulting fastener element chain. According to an aspect of the invention, the runners and sprues are cut away and pelletized immediately after the slide fastener chain has been withdrawn from the molding machine, and are recycled continuously for re-use in combination with the master chips and the slave chips.

According to another aspect of the invention, the amount of feed of the master chips and the slave chips is controlled so that this chip mixture is in a constant ratio with respect to the recycled chips when charged to the molding machine.

These and other features of the invention will be better understood from the following description taken in connection with preferred embodiments and in light of the accompanying drawings in which like or corresponding parts are designated by like numerals.

DETAILED DESCRIPTION

Figure 3:
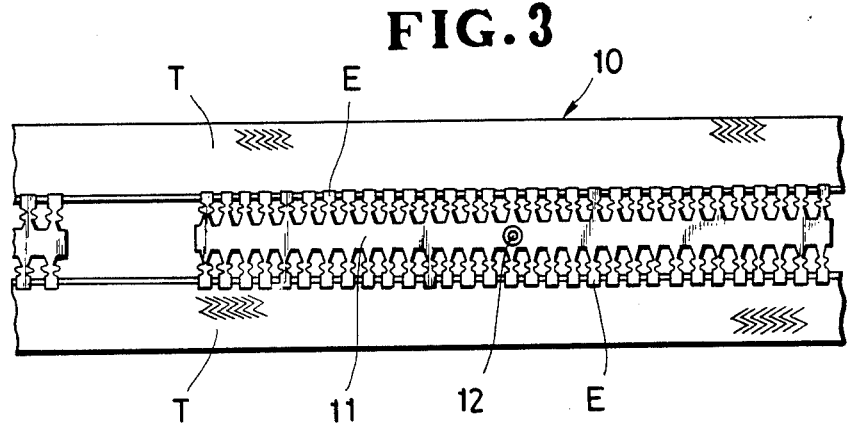
FIG. 3 is a plan view of a slide fastener chain that has been released from the molding machine of FIG. 1.

In FIG. 3, there is shown a slide fastener chain 10 which comprises a pair of stringer tapes T, T each carrying a series of discrete coupling elements E made of a thermoplastic material, the coupling elements having a choice of different colors compatible with an article to which the fastener is applied. The fastener chain 10 is shown disposed immediately after it has been injection-molded and released from the mold, so that the molded elements E are still accompanied by runners 11 and sprues 12 that will be subsequently removed in a manner hereinafter described.

Figure 1:
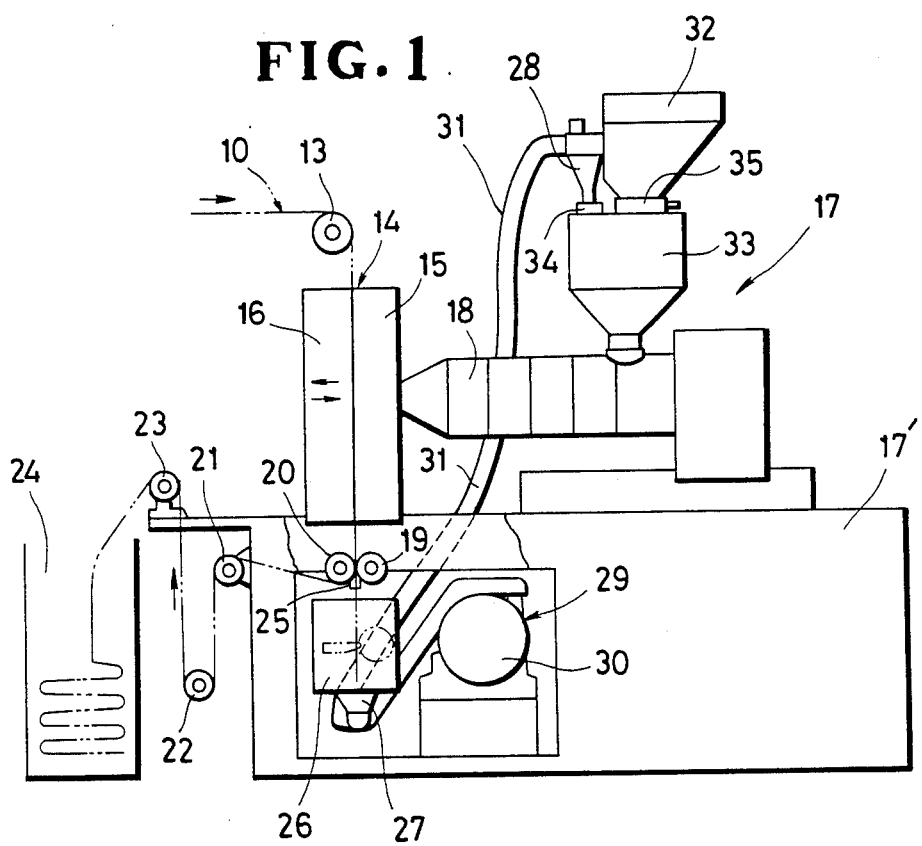
FIG. 1 is a schematic side elevation showing the general construction of an injection molding machine according to a preferred embodiment of the invention.
Figure 2:
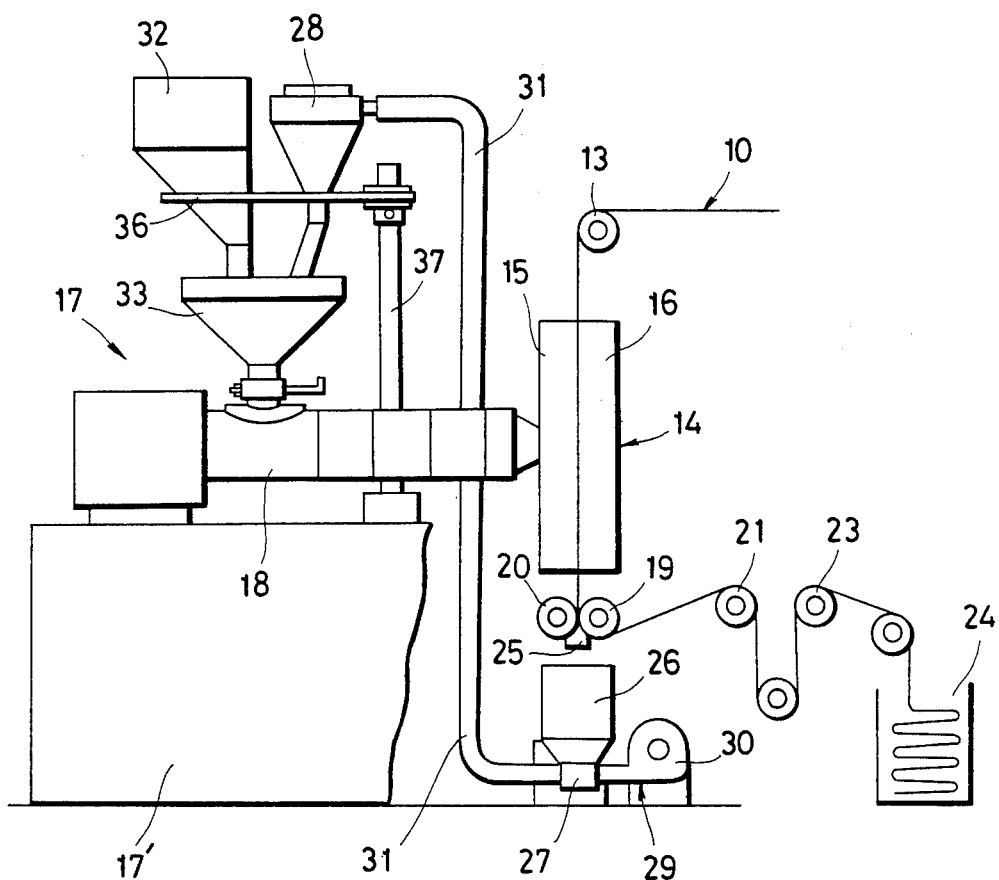
FIG. 2 is a view analogous to FIG. 1 but showing another preferred form of machine according to the invention.

As shown in in each of the embodiments of FIGS. 1 and 2, a starting fastener chain 10 devoid of coupling elements E (FIG. 3) is passed around a guide roll 13 and into a mold 14 comprising a stationary die 15 and a movable die 16 in an injection-molding machine generally designated 17. The machine 17 per se is of any conventional construction including a heating cylinder 18 operatively associated with the molding dies 15, 16. The fastener chain 10, after having injection-molded thereon series or rows of coupling elements E is withdrawn from the mold 14 via a pair of feed rolls 19, 20 and a group of guide rolls 21, 22 and 23 and stored in a chamber 24 in a manner well known in the art.

In accordance with the invention there is provided a cutting means 25 immediately adjacent to and downstream of the mold 4 for cutting and removing runners 11 and sprues 12 (FIG. 3) or other debris of the plastic material that have been formed integrally with the coupling elements E. The runners 11 and sprues 12 thus removed are taken into a pelletizer 26 (located adjacent to the cutting means 25) and designed to cut them into pellets or chips $C_1$ of a desired size FIG. 4. These pellets or chips $C_1$ are collected in a reservoir 27 at the bottom of the pelletizer 26 and from there delivered or recycled to a first hopper 28 located above the heating cylinder 18, for which purpose there is provided a delivery means 29 comprising a fan 30 and a conduit piping 31 communicating between the fan 30 and the first hopper 28.

Parallel with the first hopper 28 is provided a second hopper 32 for receiving a supply of colored master chips $C_2$ and colorless slave chips $C_3$, both being thermoplastic.

The first and second hoppers 28 and 32 are detachably mounted on a mixing hopper 33 and have their respective tapered bottomless ends opening into the mixing hopper 33 which in turn has its bottom open to communicate with the interior of the heating cylinder 18, the arrangement being that chips $C_2$, $C_3$ are let fall by their own gravity through the hopper 33 into the cylinder 18.

The ratio of recycled chips $C_1$ to combined fresh chips $C_2$, $C_3$ is importantly 40–60:60–40 in order to absolutely minimize reduction in physical properties of the resulting coupling elements E, which properties including mechanical strength and deviations or irregularities in the color of the resulting coupling elements E.

To this end, in the embodiment shown in FIG. 1, there are provided shutter means 34 and 35 for the first and second hoppers 28, 32, for thereby maintaining a controlled rate of supply of respective chips $C_1$, $C_2$ and $C_3$. When the color of the coupling elements E in the chain 10 to be manufactured is changed, the shutter means 34, 35 are fully closed and then the first and second hoppers 28, 32 are removed from the mixing hopper 33 for discharging the chips $C_1$, $C_2$, $C_3$ remaining in the respective hoppers 28, 32.

Figure 4:
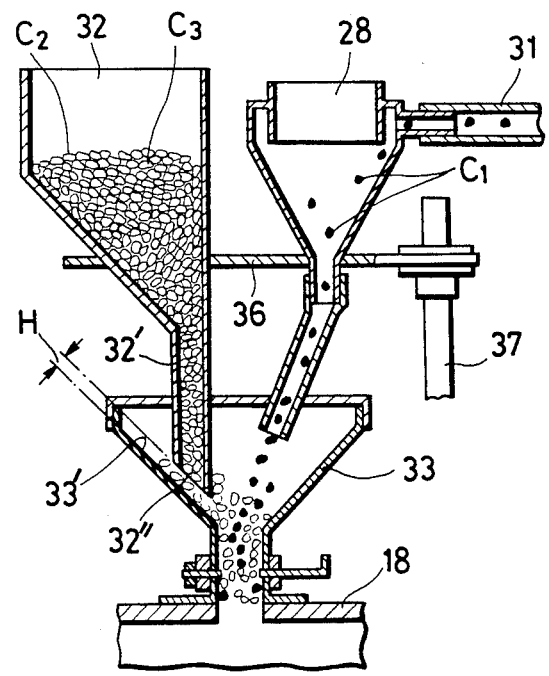
FIG. 4 is a longitudinal cross-sectional view of a hopper part of the machine of FIG. 1.

In the embodiment shown in FIGS. 2 and 4, the second hopper 32 for fresh chips $C_2$, $C_3$ has a reduced bottom outlet 32' with a slanted open end 32" which lies parallel to a tapered inner peripheral wall 33' of the mixing hopper 33. The slanted end 32" of the hopper 33 is spaced a predetermined distance or clearance H apart from the peripheral wall 33' of the hopper 32 such that the inventory of fresh chips $C_2$, $C_3$ in the hopper 33 may be maintained constant with respect to a given supply of recycled chips $C_1$. A vertically movable bar 36 extends horizontally from a vertical column 37 secured to the frame 17' and is adapted to support thereon the second hopper 32. This bar 36 may be raised to permit the hopper 32 to be detached from the mixing hopper 33, or varied in position to adjust the clearance H thereby maintaining controlled inventory of fresh chips $C_2$, $C_3$ with respect to recycled chips $C_1$ depending upon the rate of molding speed of the machine. With the hoppers 28, 32, 33 thus constructed, the amount of the fresh chips $C_2$, $C_3$ with respect to the amount of the recycled chips $C_1$ is maintained constant without using a separate metering device.

An important feature of the invention resides in the concept of removing and pelletizing runners and sprues of the plastic material from the fastener chain immediately upon release from the mold and subsequently recycling pelletized chips for re-use in combination with fresh thermoplastic chips, so that such recycled chips may not undergo any substantial change in their physico-chemical properties which would otherwise result in irregular or heterogeneous color distribution of the coupling elements on the finished slide fastener.

Although certain preferred embodiments have been shown and described, it should be understood that many changes and modifications may be made therein without departing from the scope of the appended claims.

What is claimed is:

1. In the manufacture of a slide fastener chain having molded thereon rows of coupling elements made of a thermoplastic material, a process which comprises the steps of: cutting and removing runners and sprues from the rows of coupling elements immediately after the fastener chain has been withdrawn from a mold; pelletizing the runners and sprues to a predetermined particle size; recycling the thus pelletized material for re-use in combination with a fresh supply of thermoplastic chips; and controllng a supply of the pellitized material and the fresh supply of thermoplastic chips to fall within a predetermined ratio.

2. A method according to claim 1, said predetermined ratio of said supply of said palletized material to said fresh supply of thermoplastic chips being 40–60:60–40.

* * * * *